United States Patent [19]

Dhein et al.

[11] 4,267,082
[45] May 12, 1981

[54] AIR-CROSS-LINKABLE POLYACRYLATE LACQUER BINDERS CONTAINING CHEMICALLY FIXED WOOD PRESERVATIVES

[75] Inventors: Rolf Dhein, Krefeld; Gerswid Poetter, Rheinberg; Hans Rudolph, Krefeld, all of Fed. Rep. of Germany

[73] Assignee: Bayer Aktiengesellschaft, Fed. Rep. of Germany

[21] Appl. No.: 34,551

[22] Filed: Apr. 30, 1979

[30] Foreign Application Priority Data

May 3, 1978 [DE] Fed. Rep. of Germany ....... 2819340

[51] Int. Cl.$^3$ .................. C09D 3/28; C09D 3/80; C09D 5/14
[52] U.S. Cl. .................. 260/23 AR; 106/18; 106/18.35; 260/23 EP
[58] Field of Search .................. 260/23 EP, 23 AR; 106/18, 18.35

[56] References Cited

U.S. PATENT DOCUMENTS

| | | | |
|---|---|---|---|
| 2,789,060 | 4/1957 | Spangenberg et al. | 106/18 |
| 3,736,280 | 5/1973 | Grivas | 260/23 AR |
| 3,847,851 | 11/1974 | Tugukuni et al. | 260/23 AR |
| 4,039,494 | 8/1977 | Drisko | 260/22 A |
| 4,129,537 | 12/1978 | Dhein et al. | 260/23 EP |
| 4,146,519 | 3/1979 | Dhein et al. | 260/23 EP |

FOREIGN PATENT DOCUMENTS

| | | | |
|---|---|---|---|
| 767476 | 2/1957 | United Kingdom | 260/23 AR |
| 793776 | 4/1958 | United Kingdom | 260/23 AR |
| 1227398 | 4/1971 | United Kingdom | 260/23 AR |

*Primary Examiner*—Ronald W. Griffin
*Attorney, Agent, or Firm*—Connolly and Hutz

[57] ABSTRACT

An air-cross-linkable lacquer binder comprising a copolymer of copolymerized units of from 10 to 40% by weight of glycidyl acrylate, glycidyl methacrylate or a mixture thereof, and 70 to 10% by weight of at least one other vinyl monomer which has been reacted with (based in each case on the quantity of lacquer binder) of from 0.01 to 30% by weight of at least one wood preservative having at least one glycidyl-reactive hydrogen atom and from 20 to 60% by weight of at least one air-drying natural or isomerized fatty acid and from 0 to 10% by weight of a dicarboxylic acid anhydride, said lacquer binder having an average molecular weight $\overline{M}_n$ of from 1500 to 15,000 and an acid number of from 3 to 15. One special advantage of the lacquer binder according to the invention is that the wood preservatives are chemically fixed to the polymer molecule so that their release is retarded and the protective action is prolonged. Another advantage is the possibility to prepare well-drying wood preservative systems with lacquers which have not been treated with drying agents.

3 Claims, No Drawings

AIR-CROSS-LINKABLE POLYACRYLATE LACQUER BINDERS CONTAINING CHEMICALLY FIXED WOOD PRESERVATIVES

This invention relates to air-cross-linkable lacquer binders for wood and wood products, based on glycidyl (meth)acrylate copolymers which have been reacted with wood preservative agents containing at least one glycidyl reactive hydrogen atom and then esterified with dehydrating fatty acids and optionally dicarboxylic acid anhydrides.

Wood preservative surface treatment is becoming increasingly important, and for precious woods it is frequently preferred to use only clear or lightly coloured lacquers in order to retain the appearance of the wood grain.

Long oiled alkyd resins have proved to be particularly suitable for the surface treatment of wood, partly because of their ready solubility and processibility and partly because of the chemical cross-linking produced by oxidative drying.

These alkyd resins are mostly polyesters synthesised from phthalic acid anhydride, pentaerythritol and/or glycerol and unsaturated natural fatty acids of soya bean oil and linseed oil, and their polyester chain is, of course, subject to a certain saponification due to environmental factors and weathering.

To reinforce the wood preservative action, active ingredients which destroy wood pests, for example pentachlorophenol, are added to the lacquers based on alkyd resins. Such active ingredients are able to penetrate the wood with the surface treatment or lacquering and retain their effect so long as they are not lost as a result of their volatility or migration (see Journal "Holz als Roh- und Werkstoff," No. 31 (1973), pages 137 to 140).

Polyacrylates are also known as lacquer raw materials and are used preferably for metal lacquering, where they are either physically drying or cross-linked by melamine resins.

Numerous attempts have also been made to produce air-cross-linkable polyacrylates.

Such air-cross-linkable polyacrylates can be obtained from polyacrylates containing hydroxyl groups by esterification thereof with unsaturated fatty acids, but the products obtained in this way have the disadvantage of not providing a sufficiently high gloss (see British Pat. Nos. 767,476 and 793,776).

If a reaction with dicarboxylic acid anhydrides is added to the reaction of the glycidyl polyacrylates with unsaturated fatty acids so that semi-esters with acid numbers of from 20 to 60 are obtained (see British Pat. No. 1,227,398), the problem of insufficient gloss of pigmented lacquers is overcome but at the same time, if these lacquers have been dried and stabilized against skinning by treatment with oximes, their good drying properties are very soon lost in storage (see Comparison Experiment 1).

This already indicates a certain sensitivity of air-cross-linkable polyacrylates towards additives.

A further drastic increase in the drying time occurs in such air-cross-linkable polyacrylates when attempts are made to add active ingredients of the pentachlorophenol type for wood preservatives surface treatment or lacquering (see Comparison Experiment 2).

It has now surprisingly been found that very valuable wood preservative lacquer binders based on air-cross-linkable polyacrylates may be obtained when copolyacrylates containing glycidyl groups are reacted with wood preservatives containing epoxide-active hydrogen atoms with partial decomposition of the epoxide functions, and the remaining glycidyl groups, which preferably constitute the majority, are successively esterified with drying fatty acids and optionally with dicarboxylic acid anhydrides to form semi-esters.

One special advantage of the lacquer binders according to the invention is that the wood preservatives are chemically fixed to the polymer molecule so that their release is delayed and the protective action is prolonged.

This invention thus provides an air-cross-linkable lacquer binder comprising a copolymer of copolymerised units of from 10 to 40% by weight of glycidyl acrylate, glycidyl methacrylate or a mixture thereof, and 70 to 10% by weight of at least one other vinyl monomer which has been reacted with (based in each case on the quantity of lacquer binder) of from 0.01 to 30% by weight of at least one wood preservative having at least one glycidyl-reactive hydrogen atom and from 20 to 60% by weight of at least one air-drying natural or isomerised fatty acid and from 0 to 10% by weight of a dicarboxylic acid anhydride, said lacquer binder having an average molecular weight $M_n$ of from 1500 to 15,000 and an acid number of from 3 to 15.

The following are further examples of suitable vinyl monomers: styrene and styrenes which are substituted with methyl groups and chlorine in the nucleus, $\alpha$-methyl styrene, vinyl acetate, (meth)acrylamide, (meth)acrylonitrile, (meth)acrylic acid alkyl esters, preferably styrene and (meth)acrylic acid alkyl esters having from 1 to 10 carbon atoms in the alcohol component.

Preparation of the copolymers containing epoxide groups is carried out in known manner by radical copolymerisation of the vinyl monomers with the comonomers which contain epoxide groups, preferably in organic solvents (see British Pat. Nos. 793,776; 767,476 and 1,227,398).

The binder preferably contains from 5 to 40% by weight of copolymerised units of glycidyl acrylate and/or glycidyl methacrylate.

The wood preservatives which are contained in a chemically fixed form in the lacquer binders according to the present invention have at least one glycidylreactive hydrogen atom and they preferably contain at least one phenolic hydroxyl group. The following are specific examples: chlorophenols having from 1 to 5 chlorine atoms in the benzene ring; 3-methyl-4-chlorophenol; o-hydroxy-diphenyl; 2,2'-dihydroxy-5,5'-dichlorodiphenyl methane; benzyl phenols; p-chloro-o-benzylphenol; benzyl cresols; chloroxylenols; or mixtures of the above mentioned compounds; in particular pentachlorophenol.

Addition of the wood preservatives to the glycidyl groups of the copolymer may be carried out solvent-free but is preferably carried out in solvents. Examples of suitable solvents include toluene, xylene, mixtures of aromatic compounds having boiling points of from 80° C. to 170° C., ethyl glycol acetate, methyl ethyl ketone, methyl isobutyl ketone, and optionally also a proportion of mineral spirits. The reaction temperatures may be in the range of from 80° to 150° C. although temperatures above or below these limits may be employed in special cases. If desired, the addition reaction may be carried out in the presence of approximately 0.01 to 3% by weight, based on the glycidyl groups, of basic catalysts such as tertiary amines or alkali metal hydroxides. The quantity of wood preservative chemically fixed in the lacquer binder is preferably from 0.01 to 30% by weight although this quantity may be substantially exceeded if the lacquer binder containing the fixed wood preservative is to be mixed with lacquer ingredients which are free from these agents, provided only that the total mixture of binders contains from 0.01 to 30% by weight of fixed wood preservative.

The subsequent addition of drying fatty acids (i.e. naturally drying and isomerised drying fatty acids) to the copolymers containing epoxide groups is preferably carried out in the absence of catalysts, at temperatures of, generally, from 60°–200° C., preferably from 100°–170° C., and it is, generally, carried out in organic solvents, such as xylene or solvent naphtha, until the acid number, based on the solvent-free binder (copolymer + wood preservative + drying fatty acids + optionally dicarboxylic acid anhydride) is below 15, preferably below 12.

The quantity of drying fatty acids in the solvent-free binder may be from 20 to 60% by weight and is preferably from 35 to 60% by weight.

Examples of natural drying fatty acids include the fatty acids of linseed oil, soya bean oil, sunflower oil, cotton seed oil, ground nut oil, tall oil and safflower oil in their natural composition, i.e. as mixture of saturated, mono-saturated and/or multi-unsaturated fatty acids which have drying properties. The multi-unsaturated fatty acids mainly have isolated double bonds. The fatty acids of the oils mentioned above, for example, have approximately the following composition in percentages by weight:

(=10,12,14-octadecatrienoic acid), parinaric acid (9,11,13,15-octadecatrienoic acid), licanic acid (4-keto-9,11,13-octadecatrienoic acid) and the stereo isomers of the above-mentioned acids, preferably 9,11-linoleic acid and eleostearic acid and their stereo isomers.

Isomerisation of natural drying fatty acids is carried out by known methods and has been described, for example, in Ullmanns Enzyklopädie der technischen Chemie, (1956), Vol. 7, pages 538 to 539.

The copolymers which contain glycidyl groups and have been reacted with wood preservative and drying fatty acids may also have been modified with up to 10% by weight, based on the binder, of carboxylic acid anhydrides by a reaction of the resulting or already present hydroxyl groups in the etherified and esterified reaction products with the carboxylic acid anhydride group to form semi-esters.

The following are examples of suitable dicarboxylic acid anhydrides: succinic acid anhydride, maleic acid anhydride, phthalic acid anhydride, tetrahydrophthalic acid anhydride, hexahydrophthalic acid anhydride, methylhexahydrophthalic acid anhydride, endomethylene tetrahydrophthalic acid anhydride, halogenated phthalic acid anhydrides such as tetrachlorophthalic acid anhydride, tetrabromophthalic acid anhydride, 1,4,5,6,7,7-hexachlorobicyclo(2,2,1)-heptene-5-dicarboxylic acid-(2,3)-anhydride and diglycollic acid anhydride.

Tetrahydrophthalic acid anhydride and its isomers are preferred.

The addition reaction of the anhydrides with the hydroxyl groups of the copolymers obtained, which

|  |  | Linseed oil | Soya bean oil | Sunflower oil | Cotton seed oil | Ground nut oil | Tall oil | Safflower oil |
|---|---|---|---|---|---|---|---|---|
| Myristic acid | ($C_{14}$) | 0.2 | — | — | 3.3 | 0.5 | — | 0.1 |
| Palmitic acid | ($C_{16}$) | 5.6 | 6.5 | 3.5 | 19.9 | 7.8 | 4.6 | 4.5 |
| Stearic acid | ($C_{18}$) | 3.5 | 4.5 | 2.9 | 1.3 | 3.1 | 4.6 | 2.0 |
| Arachidic acid | ($C_{30}$) | 0.6 | 0.7 | 0.6 | 0.6 | 2.4 | — | 0.4 |
| Behenic acid | ($C_{22}$) | — | — | — | — | 3.1 | — | 0.4 |
| Lignoceric acid | ($C_{24}$) | 0.1 | — | 0.4 | — | 1.1 | — | — |
| Oleic acid | ($C_{18}$) | 21.0 | 33.5 | 34.1 | 29.6 | 56.0 | 30 | 20 |
| Linoleic acid | ($C_{18}$) | 24.0 | 52.5 | 58.5 | 45.3 | 26.0 | 24 | 70 |
| Linolenic acid | ($C_{18}$) | 45.0 | 2.3 | — | — | — | 8 | 3 |

The natural drying fatty acids contain about 5 to 25% by weight of saturated $C_8$–$C_{24}$ fatty acids, 20 to 60% by weight of monoolefinically unsaturated $C_{18}$ fatty acids, in particular oleic acid, and 25 to 75% by weight of triply and/or doubly unsaturated $C_{18}$ fatty acids having mainly isolated double bonds.

The isomerised drying fatty acids contain from 40 to 80% by weight of conjugated fatty acids and may be obtained by isomerisation of the natural drying fatty acids. $C_{18}$ fatty acids having at least two conjugated double bonds are conjugated fatty acids.

The following are examples:
9,11-linoleic acid, 10,12-linoleic acid, 8,10-octadecadienoic acid, eleostearic acid (=9,11,13-octadecatrienoic acid), pseudo eleostearic acid contain the active wood preservative ingredient and fatty acid, and semi-ester formation are carried out at temperatures of about 50° to 180° C., preferably from 100° to 140° C. The dicarboxylic acid anhydride is used in such quantities that the acid number obtained after semi-ester formation, based on the quantity of binder, is from 3 to 15 mg of KOH per g of substance.

The quantities of dicarboxylic acid anhydride are preferably from 0.5 to 3% by weight, based on all the components of the binder (copolymer + wood preservative + fatty acids + optionally dicarboxylic acid anhydride). Higher acid numbers severely retard drying in the presence of oximes.

The acid numbers of the air-cross-linkable lacquer binders are in the range of from 3 to 15 and are derived either entirely from free fatty acids which are still capable of being cross-linked by air, in which case the acid number should as far as possible be below 12, or from free fatty acids still capable of being cross-linked by air and semi-ester groups obtained from the optional subsequent anhydride reaction. The average molecular weights ($\overline{M}_n$, number average) of the lacquer binders according to the invention are 1500 to 15,000, preferably from 1800 to 9,000, determined in tetrahydrofuran by measuring the lowering of the vapour pressure.

For the production of paints and lacquers, the usual solvents, pigments, dyes, auxiliary agents, stabilizers, anti-skinning agents, siccatives and fillers are added to the binders according to the invention.

If the lacquers are required as impregnating agents for preserving wood, it is preferred to use clear or only slightly pigmented lacquer solutions highly diluted with solvents such as petroleum hydrocarbons.

Particularly preferred air-cross-linkable lacquer binders according to the invention are prepared from the following components, the quantities given being based on copolymer+wood preservative+drying fatty acids-+optionally dicarboxylic acid anhydride:

(a) 10 to 40% by weight, in particular 15 to 35% by weight, of copolymerised units of glycidyl acrylate, glycidyl methacrylate or mixtures thereof, (b) 70 to 10% by weight, in particular 20 to 40% by weight, of copolymerised units of at least one of the monomers, styrene and (meth)acrylic acid ester having from 1 to 10 C-atoms in the alcohol component, (c) 0.01 to 30% by weight, in particular 5 to 20% by weight, of wood preservative having at least one glycidylreactive hydrogen atom, chemically fixed in the lacquer binder by addition of the reactive hydrogen of the wood preservative to the glycidyl groups of the copolymers of (a) and (b), 20 to 60% by weight, in particular 30 to 50% by weight, of air-drying, natural or isomerised fatty acids or mixtures thereof, chemically fixed in the lacquer binder by esterification with glycidyl or hydroxyl groups or mixtures thereof of the polymer of (a), (b) and (c), and (e) 0 to 10% by weight, in particular 0.5 to 3% by weight, of dicarboxylic acid anhydride chemically fixed in the preservative lacquer by semi-esterification with the hydroxyl groups of the polymer of (a), (b), (c), and (d).

The parts and percentages given in the Examples are based on weight. The molecular weights $\overline{M}_n$ were determined osmometrically by the method of lowering of the vapour pressure in tetrahydrofuran.

COMPARISON EXAMPLE 1

(without wood preservative)

A glycidyl polyacrylate having a viscosity of 40 sec (determined according to DIN 53 211) after dilution to 40% with xylene is first prepared by polymerising the following monomer mixture:
934.2 parts of styrene,
482.4 parts of methyl methacrylate,
38.4 parts of butyl acrylate, and
681.6 parts of glycidyl methacrylate, in the presence of
46.1 parts of di-tert.-butyl peroxide and
10.9 parts of dodecyl mercaptan
in 2043.6 parts of xylene at 110° C. by a conventional polymerization method.

974.6 Parts of an isomerised soya oil fatty acid containing
about 8% of saturated $C_{12}$ to $C_{18}$ fatty acid, about 31% of oleic acid,
about 51% of linoleic acid, and
about 10% of linolenic acid
in which from 42 to 48% of the linoleic and linolenic acid is present in the form of conjugated dienes, are added to 3,440.9 parts of the 42% copolymer solution and the mixture is esterified at 135° C. in a nitrogen atmosphere until it has the acid number 13. The viscosity of a 40% solution in xylene is 42 seconds (DIN 53 211).

27.1 Parts of tetrahydrophthalic acid anhydride are then added to 4,171.5 parts of the 56.5% solution in xylene obtained above and the mixture is converted to the semi-ester by reaction at 130° C. until a polymer having the acid number 15 and a viscosity of 100 seconds (40% in xylene according to DIN 53 211) is obtained. The average molecular weight $\overline{M}_n$ is 7200.

The polymeric lacquer binder contains the following units in a copolymerised or chemically fixed form:
25.86% of styrene,
13.36% of methyl methacrylate,
1.06% of butyl acrylate,
18.87% of glycidyl methacrylate,
39.70% of conjugated soya oil fatty acid, and
1.15% of tetrahydrophthalic acid anhydride.

The 56.5% solution of the polymer in xylene is used to prepare a clear lacquer having the following composition:
100.00 parts of a 40% solution of the polymer in xylene and
1.6 parts of Co-, Pb- and Mn-naphthenate 1:2 in xylene.
The lacquer contains
0.02 parts of Co,
0.02 parts of Mn, and
0.293 parts of Pb, based on 100 parts of the polymer.
The results of drying are shown in the Table.

COMPARISON 2

(with added wood preservative)

contains:
100.00 parts of a 40% solution of the polymer from Comparison 1 in xylene,
1.00 parts of pentachlorophenol, and
1.60 parts of Co-, Pb-, Mn-naphthenate (1:2 in xylene)
which corresponds to
0.02 parts of Co,
0.02 parts of Mn, and
0.293 parts of Pb,
based on 100 parts of the polymer.
The results of drying are shown in the Table.

EXAMPLE 1

(chemically fixed wood preservative)

A copolymer containing glycidyl groups and having a viscosity of 40 seconds (DIN 53 211, 40% in xylene) is prepared from the following components:
934.2 parts of styrene,
482.4 parts of methyl methacrylate,
38.4 parts of butyl acrylate, and
681.6 parts of glycidyl methacrylate, in the presence of
46.1 parts of di-tert-butyl peroxide,
10.9 parts of dodecylmercaptan, and 2043.5 parts of xylene,
by polymerising the monomers by a conventional method in xylene at 110° C. in a nitrogen atmosphere.
28.8 parts of pentachlorophenol, and
953.9 parts of the fatty acid mixture from Comparison 1 are then added to
3528.0 parts of the approximately 42% solution of the copolymer in xylene and the reaction mixture is esterified in a nitrogen atmosphere at 135° C. until an acid number of 12 and a viscosity of about 40 seconds (DIN 53 211, 40% in xylene) are obtained. It is preferable to transesterify the pentachlorophenol by etherification for 30 minutes at 120° C. before the fatty acid mixture is added.

27.8 Parts of tetrahydrophthalic acid anhydride are then added at 130° C. to 4278.7 parts of the 56.1% solution of the copolymer modified with pentachlorophenol and fatty acid mixture obtained as described above, and the components are reacted to form the semi-ester which has the acid number 15 and a viscosity of about 100 seconds (DIN 53 211, 40% in xylene). The average molecular weight $\overline{M}_n$ is 8850.

The polymeric lacquer binder contains the following units in a copolymerised or chemically fixed form:
25.86% of styrene,
13.36% of methyl methacrylate,
1.06% of butyl acrylate,
18.87% of glycidyl methacrylate,
1.16% of pentachlorophenol,
38.54% of conjugated soya fatty acid, and
1.15% of tetrahydrophthalic acid anhydride.

This lacquer binder was also used to prepare an air-drying clear lacquer, in this case already containing condensed pentachlorophenol. The lacquer had the following composition:
100.00 parts of a 40% polymer solution in xylene, and
1.60 parts of Co-, Pb- and Mn- naphthenate (1:2 in xylene),
which corresponds to
0.02 parts of Co,
0.02 parts of Mn, and
0.293 parts of Pb, based on 100 parts of polymer.

The results of drying are shown in the Table.

The Table explains the different drying properties and clearly shows the advantages of the polymers according to the invention, which contain condensed active ingredients.

The results clearly show that the binder according to the invention, containing active ingredient condensed therein, has very good drying properties even after storage whereas if the active ingredient is simply mixed with the binder, drying is noticeably slowed down after only 24 hours.

TABLE

Comparison of the drying times of clear lacquers stored for different lengths of time

| Clear Lacquer | Progress of drying immediately after preparation of the lacquers | | | | |
|---|---|---|---|---|---|
| Time in hours* | 0.5 | 1 | 1.5 | 2 | 2.5 |
| Comparison 1 | 2 | 0–1 | 0–1 | 0 | |
| Comparison 2 | 1 | 0–1 | 0 | | |
| Example 1 | 1 | 0 | | | |

| | Progress of drying after 24 hours storage of the clear lacquers | | | | | |
|---|---|---|---|---|---|---|
| Time in hours* | 0.5 | 1 | 1.5 | 2 | 2.5 | 3 | 3.5 |
| Comparison 1 | 2–3 | 1 | 0–1 | 0–1 | 0 | | |
| Comparison 2 | 2–3 | 1 | 0–1 | 0–1 | 0–1 | 0–1 | 0 |

TABLE-continued

Comparison of the drying times of clear lacquers stored for different lengths of time

| Example 1 | 3–4 | 1 | 0–1 | 0 |

Explanation of drying stages: tested by hand
5 = moist
4 = very tacky
3 = slightly tacky
2 = dust dry
1 = almost tack free
0 = dry

*Time: given in hours and half hours after the samples have been painted on glass plates.

In another example containing a larger quantity, the difference between chemically fixed pentachlorophenol and physically added pentachlorophenol is even more marked.

COMPARISON 3

A binder free from pentachlorophenol and having the following percentage composition (copolymerised or chemically fixed units in percent by weight) is prepared by an analogous method to that of Comparisons 1 and 2:
25.9 styrene,
13.3 methyl methacrylate,
1.1 butyl acrylate,
18.9 glycidyl methacrylate,
39.7 conjugated soya fatty acid, and
1.1 tetrahydrophthalic acid anhydride.

19.9% of pentachlorophenol, based on the binder and pentachlorophenol, are added to 100 parts by weight of the 40% solution of this polymer in a mixture of aromatic compounds, and a clear lacquer is prepared from these components, dried with 2% cobalt octoate (6% metal content) based on the solid binder and stabilized with 1.5% of anti-skinning agent (88% butanone oxime solution).

EXAMPLE 2

A binder according to the invention containing pentachlorophenol condensed therein and having the following composition (copolymerised or chemically fixed units in percent by weight) is prepared by a method analogous to that of Example 1:
25.9% by weight of styrene,
13.3% by weight of methyl methacrylate,
1.1% by weight of butyl acrylate,
18.9% by weight of glycidyl methacrylate,
19.9% by weight of pentachlorophenol,
19.8% by weight of conjugated soya fatty acid, and
1.1% by weight of tetrahydrophthalic acid anhydride.

100 Parts of the 40% solution of this polymer according to the invention were dried in the same way as Comparison 3.

The drying time of the binder of Example 2 is 4½ hours whereas that of the binder in Comparison 3 which contains only physically added pentachlorophenol is over 8 hours.

The following Example 3 shows that in some lacquer formulations it is also possible to prepare well drying wood preservative systems with lacquers which have not been treated with drying agents.

EXAMPLE 3

The binder from Example 2 containing chemically fixed condensed pentachlorophenol is dissolved to form a 16.5% solution in a mixture of aromatic compounds without the addition of siccatives or anti-skinning agents. The time required for tack-free drying on glass plates is about 2 hours.

A pigmented lacquer can also be prepared without siccatives or anti-skinning agents by using the following lacquer composition:

30 parts of a 55% solution of the binder from Example 2 in a mixture of aromatic compounds,
67 parts of a mixture of aromatic compounds and
3 parts of a pigment preparation (about 30% pigment in alkyd resin). Drying time: 2½ hours.

Other insecticides as well as pigments may be added to such formulations.

30 parts of the binder solution as indicated above,
66.5 parts of a mixture of aromatic compounds,
0.5 parts of γ-hexachlorocyclohexane as insecticide, and
3.0 parts of pigment preparation as indicated above.
Drying time: 2½ hours.

We claim:

1. An air cross-linkable lacquer binder comprising a copolymer of copolymerised units of from 10 to 40% by weight of glycidyl acrylate, glycidyl methacrylate or a mixture thereof, and 70 to 10% by weight of at least one other vinyl monomer which has been reacted with, based in each case on the quantity of lacquer binder, from 0.01 to 30% by weight of at least one wood preservative having at least one glycidyl-reactive phenolic hydroxyl group and from 20 to 60% by weight of at least one air-drying natural or isomerised fatty acid and from 0 to 10% by weight of a dicarboxylic acid anhydride, said lacquer binder having an average molecular weight $\overline{M}_n$ of from 1500 to 15,000 measured in tetrahydrofuran by determining the lowering of vapor pressure and an acid number of 3 to 15.

2. An air-cross-linkable lacquer binder according to claim 1, wherein the wood preservative is pentachlorophenol.

3. An air-cross-linkable lacquer binder according to claim 1, wherein the copolymer comprises copolymerised units of from 10 to 40% by weight of glycidyl acrylate, glycidyl methacrylate or a mixture thereof and 70 to 10% by weight of at least one of the monomers of styrene or an acrylic or methacrylic acid ester with 1 to 10 carbon atoms in the alcohol moiety, the percentages are based on the quantity of lacquer binder.

* * * * *

UNITED STATES PATENT OFFICE
CERTIFICATE OF CORRECTION

Patent No. 4,267,082     Dated May 12, 1981

Inventor(s) Dhein et al

It is certified that error appears in the above-identified patent and that said Letters Patent are hereby corrected as shown below:

On the cover page, Item 73 should read

--Assignee: Bayer Aktiengesellschaft, Fed. Rep. of Germany and Desowag-Bayer Holzschutz GmbH, Fed. Rep. of Germany--

Signed and Sealed this

Thirteenth Day of October 1981

[SEAL]

*Attest:*

*Attesting Officer*

GERALD J. MOSSINGHOFF

*Commissioner of Patents and Trademarks*